United States Patent
Stoev et al.

(10) Patent No.: US 7,423,838 B2
(45) Date of Patent: Sep. 9, 2008

(54) SERVO CONTROL METHOD AND APPARATUS SUITABLE FOR THE SAME

(75) Inventors: Julian Stoev, Seoul (KR); Jun-seok Shim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 11/252,717

(22) Filed: Oct. 19, 2005

(65) Prior Publication Data

US 2006/0176607 A1  Aug. 10, 2006

(30) Foreign Application Priority Data

Feb. 4, 2005  (KR)  ............... 10-2005-0010818

(51) Int. Cl.
*G11B 5/596* (2006.01)
(52) U.S. Cl. .................. 360/78.09; 360/78.04
(58) Field of Classification Search ........... None
See application file for complete search history.

(56) References Cited

U.S. PATENT DOCUMENTS

| | | | | |
|---|---|---|---|---|
| 5,369,345 A | * | 11/1994 | Phan et al. | ............ 318/561 |
| 5,465,035 A | * | 11/1995 | Scaramuzzo et al. | ........ 318/561 |
| 5,471,381 A | * | 11/1995 | Khan | ............ 700/48 |
| 6,574,070 B2 | * | 6/2003 | Gregg | ............ 360/78.09 |
| 6,873,490 B2 | * | 3/2005 | Guo et al. | ............ 360/78.07 |
| 7,277,764 B2 | * | 10/2007 | Hovakimyan et al. | ........ 700/28 |
| 2006/0082922 A1 | * | 4/2006 | Shih | ............ 360/78.06 |

* cited by examiner

*Primary Examiner*—Jason C Olson
(74) *Attorney, Agent, or Firm*—Sughrue Mion, PLLC

(57) ABSTRACT

A servo control method of controlling a plant to track a reference trajectory with enhanced accuracy using a reference signal and its derivative signals, an apparatus and a recording medium suitable for same. The servo control method includes: determining a polynomial indicating a reference trajectory desired by a plant and derivatives of the polynomial; sampling a plant output with respect to a plant input; generating a reference signal and its derivative signals with reference to a time between samples (a relative time); and determining a plant input at a sampling time using the generated reference signal and its derivative signals, a delayed plant input and a delayed plant output. Accordingly, a plant is controlled to track a reference trajectory with enhanced accuracy using a reference signal and its derivative signals.

22 Claims, 13 Drawing Sheets

SERVO CONTROL METHOD AND APPARATUS SUITABLE FOR THE SAME

CROSS-REFERENCE TO RELATED PATENT APPLICATION

This application claims the benefit of Korean Patent Application No. 10-2005-0010818, filed on Feb. 4, 2005, in the Korean Intellectual Property Office, the disclosure of which is incorporated herein in its entirety by reference.

BACKGROUND OF THE INVENTION

1. Field of the Invention

The present invention relates to a servo control method using a reference trajectory, and more particularly, to a servo control method of controlling a plant to track a reference trajectory with enhanced accuracy using a reference signal and its derivative signals, and an apparatus and a recording medium suitable for the same.

2. Description of the Related Art

In general, a hard disk drive (HDD), which is a data storage device in a computer system for reproducing and writing data on a disk.

The HDD includes a head disk assembly (HDA) and a printed circuit board (PCB) assembly for writing and reading information by electrically controlling the HDA, wherein the HDA includes heads for storing or reproducing information, disks on which the information is recorded by the heads, a spindle motor for rotating the disks, an actuator arm for moving the heads, a voice coil motor (VCM), and an outer disk crash stop (ODCS) and an inner disk crash stop (IDCS) for limiting displacement of the actuator arm.

The ODCS and IDCS are stoppers for limiting the displacement of the actuator arm to prevent the heads from moving to locations at which servo information of the discs are not written.

A general tendency of the HDD industry is to decrease the physical size of storage devices while at the same time increasing information capacity. This is achieved by an increase of track density of HDDs. Servo tracks are sources for location information during an operation of an HDD. As a result, there are two main trends in servo writing of the HDD. One is to increase the accuracy for servo track writing, and the other is to develop new ways for servo track writing. U.S. Pat. No. 5,668,679 discloses a spiral self servo writing method of writing a plurality of reference servo signals on a disk in a spiral shape and writing a final servo signal based on the reference servo signals. Since accuracy of the reference servo signals determines the quality of the final servo signal, it is important to manage strictly the accuracy of the reference servo signals. That is, the positioner for controlling movement of the write heads for writing the reference servo signals must be accurate.

Due to an industrial tendency for higher accuracy, it is now important to consider several physical phenomena in controlling servo writing. Examples of such phenomena are friction, mechanical delay and torsion effect. A problem attendant with controlling such phenomena is that the forces describing these phenomena are very non-linear. Moreoever, even if it is possible to model these phenomena, such modeling is very complicated and requires significant experimentation and specialized knowledge. In addition, new methods for self servo writing also present new problems.

Figure 1:
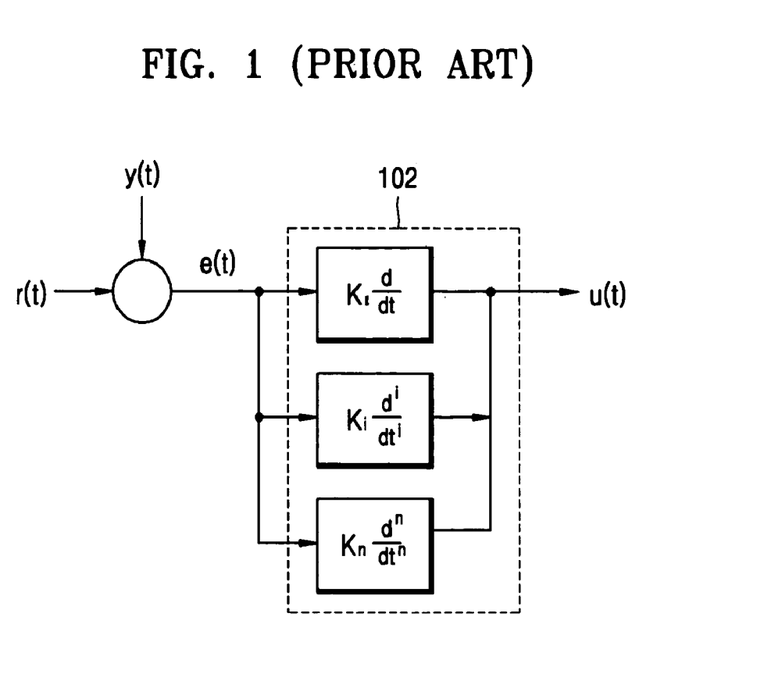
FIG. 1 is a block diagram of a conventional PID controller.

FIG. 1 is a block diagram of a conventional PID controller 102. PID controlling, which is the most frequently used method among automatic control methods, is performed using a combination of proportion, integral and differential operations.

Referring to FIG. 1, r(t) denotes a reference signal, y(t) denotes a position measurement signal, e(t) denotes an error signal provided to the PID controller 102, and u(t) denotes a control signal.

A conventional servo writing operation provides a constant reference signal having a relatively long period. According to this control algorithm, it is known that this situation establishes a point reference tracking. As a result, derivatives of the constant reference signal are 0 (zero) during a servo writing operation.

According to the development of new servo writing methods, location information is encoded on the disk in another pattern, and the reference location varies according to a location encoding method during servo writing.

This results in non-zero derivatives of the reference signal. A feedback controller is designed to ensure that the position of the servo track writing head follows a desired reference trajectory with exact and very high accuracy. Control by the PID controller 102 can be considered feed forward control. Using the feed forward control, complicated trajectories can be tracked with high accuracy.

Figure 2:
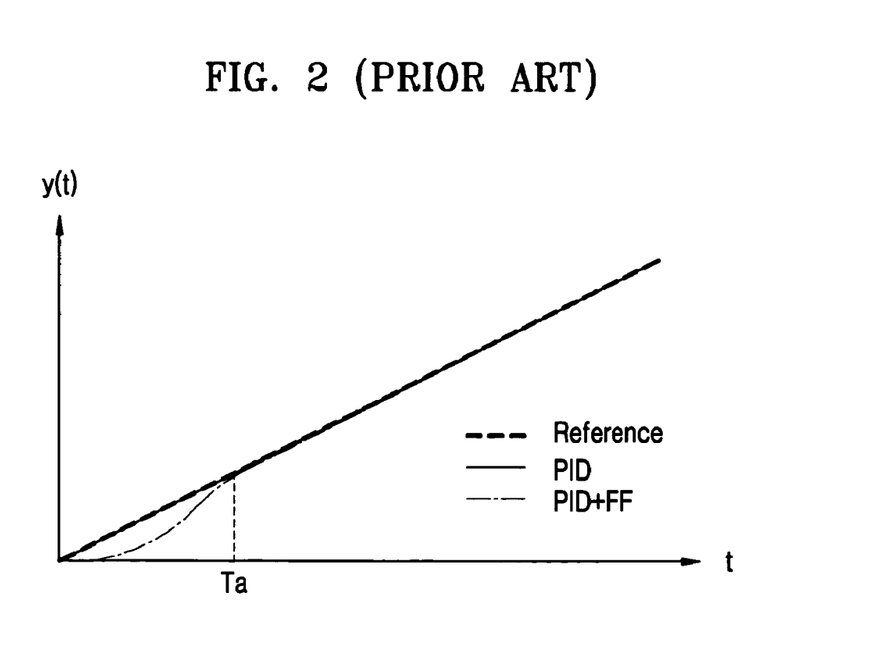
FIG. 2 is a diagram illustrating an effect of a feed forward control.

Another important contribution of the derivative feed forward control is tracking at higher speed as shown in FIG. 2.

FIG. 2 is a diagram illustrating an effect of the feed forward control.

As shown in FIG. 2, a pure PID control needs a time Ta in order to adapt to a ramp reference signal. The ramp reference signal has a constant slope. A position PID control and a feed forward control can theoretically provide fast tracking with respect to the ramp reference signal for an integrator plant, where the term "integrator plant" should be easy to understand for one of ordinary skill in the art. The integrator plant has a transfer function containing the term 1/s.

Figure 3A:
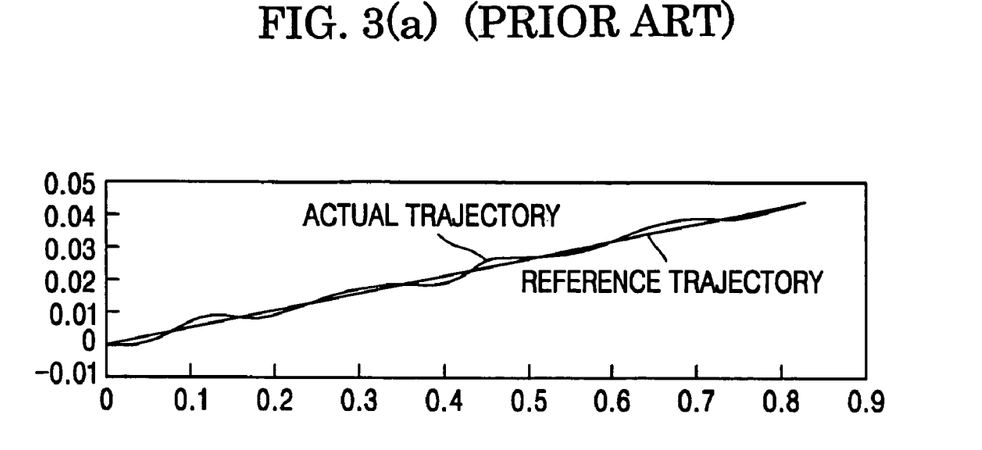
FIGS. 3(a) and 3(b) show diagrams illustrating an influence due to friction in a plant.
Figure 3B:
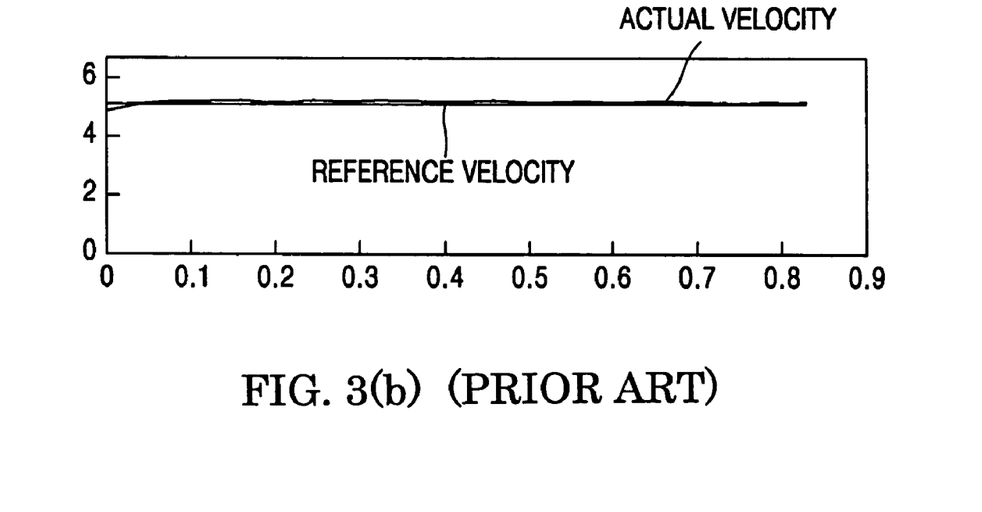

However, a problem is that a mechanical system used for servo track writing has nonlinear characteristics. As described above, the nonlinear characteristics include friction, mechanical delay and a torsion effect. As a result of higher accuracy requirements, the relative importance of these nonlinear characteristics has increased. FIGS. 3(a) and 3(b) show the influence of friction on a typical movement.

FIGS. 3(a) and 3(b) show diagrams illustrating the influence from friction in a plant. FIG. 3(a) shows a comparison of a reference trajectory of a plant (e.g., a write head of a servo writer) to an actual trajectory, and FIG. 3(b) shows a comparison of a reference value of a current supplied to a plant (e.g., a VCM for moving the write head) to obtain the movement shown in FIG. 3(a).

Referring to FIGS. 3(a)-3(b), the plant vibrates with a limited cycle while tracking the reference trajectory. The vibration of the plant is nonlinear whereas the control system is linear. This vibration may be prevented by fine tuning in certain cases. However, determining appropriate values is difficult. Furthermore, success is not always guaranteed. This limited cycle, for example, may provide an undesirable effect to forming of a servo track pattern.

Other approaches to guarantee the higher accuracy requirements are necessary. These approaches may include nonlinear controllers. A design of a high performance controller based on physical principles is time-consuming requiring very difficult and high-leveled specialized knowledge and significant experimentation. It is preferable to avoid those complicated approaches by using neural networks performing nonlinear control for controlling plants.

In computer science and engineering, artificial neural networks are inspired by structures of biological neurons. It is known that the neural networks can learn a pattern of nonlinear operations in a wide range. Characteristics of the neural networks are frequently used to control operations of a highly nonlinear and complicated system. Different neural network structures are used for different subjects.

Figure 4:
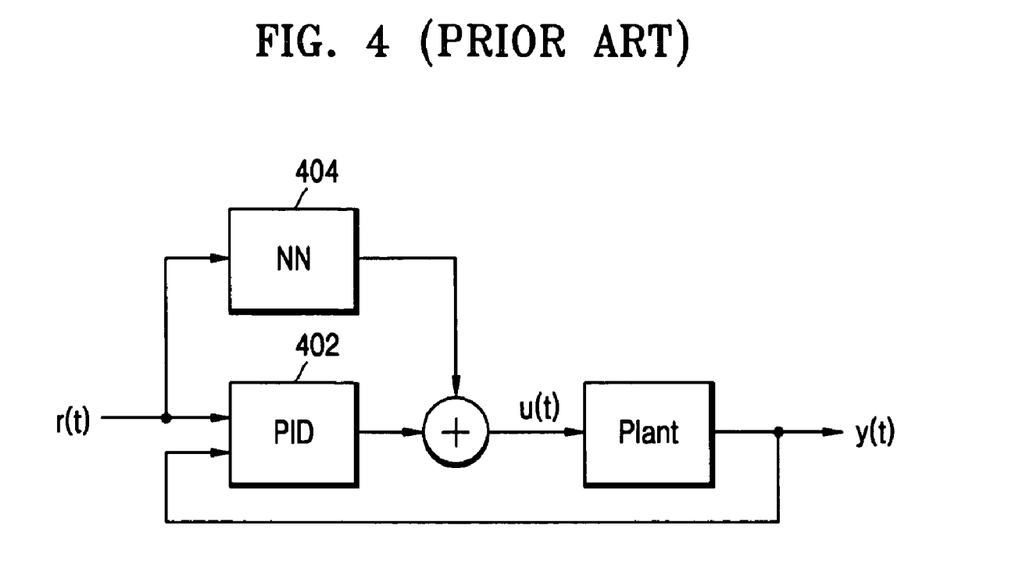
FIG. 4 is a block diagram of a controller having a conventional PID controller and a conventional feed forward neural network.

FIG. 4 is a block diagram of a controller having a conventional PID controller and a conventional feed forward neural network. The controller shown in FIG. 4 includes a PID controller 402 and a feed forward neural network 404.

However, the controller does not use derivative information of a reference signal. Besides, a closed-loop control is still linear, and therefore there is no guarantee that the limited cycle and other nonlinear effects illustrated in FIGS. 3(a) and 3(b) will be removed.

Figure 5:
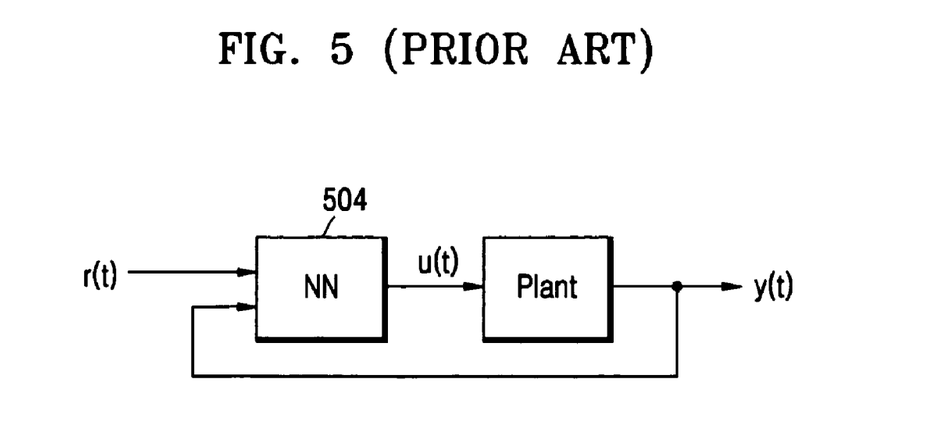
FIG. 5 is a block diagram of a controller having a conventional feedback neural network.

FIG. 5 shows a feedback neural network.

FIG. 5 is a block diagram of a controller having a conventional feedback neural network. The controller shown in FIG. 5 includes a feedback neural network 504.

The feedback neural network 504 may learn by using a plurality of different methods (e.g., a direct inverse control, an optimal control, an internal model control, etc., as is known by those skilled in the art). Only an appropriately controlled neural network avoids the limited cycle.

One problem of this approach is that it is difficult to avoid a zero steady state error even for constant velocity reference signals. This is because it is difficult to obtain an integral of the controller that can guarantee the zero steady state error. An exemplary system of a non-zero steady state error is shown in FIG. 6.

Figure 6:
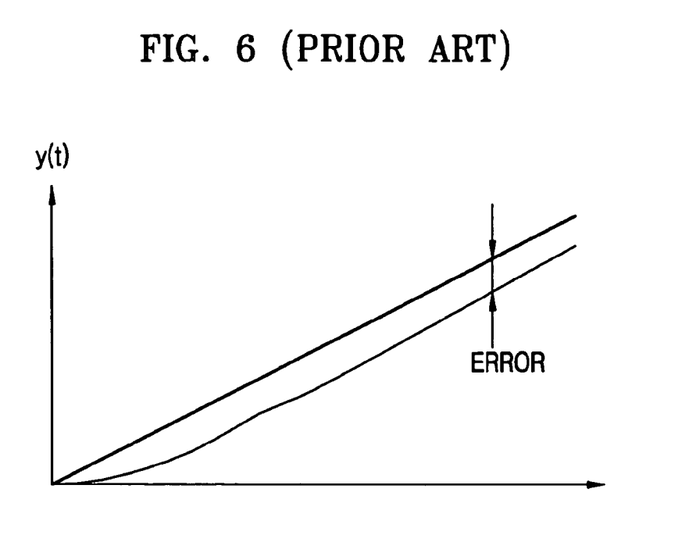
FIG. 6 is a diagram illustrating an offset error of a closed-loop system.

FIG. 6 is a diagram illustrating an offset error (non-zero steady state error) of a closed-loop system.

The non-zero steady state error shown in FIG. 6 is also not preferable during the servo track writing.

Another related technical problem is that online generation of a reference trajectory should be tracked. A present approach is to define a desired standard location by assuming that samplings of a digital control system are constant at each sampling. Though this is an effective approach, accuracy requirements increasing with respect to the servo track writing require a decrease of the sampling period, thereby making use of a lookup table inconvenient from a size standpoint.

SUMMARY OF THE INVENTION

The present invention provides a servo control method that enables a plant to track a reference trajectory with enhanced accuracy using a reference signal and its derivatives.

The present invention also provides an apparatus for implementing the servo control method.

The present invention also provides a computer readable recording medium having recorded thereon a computer readable program for performing the servo control method.

According to an exemplary embodiment of the present invention, there is provided a servo control method of controlling a plant to track a predetermined reference trajectory based on an output of the plant, the method comprising: determining a polynomial indicating a reference trajectory desired by the plant and derivatives of the polynomial; sampling a plant output with respect to a plant input; generating a reference signal and its derivative signals with reference to time between samples (a relative time); and determining a plant input at a sampling time using the generated reference signal and its derivative signals, a delayed plant input and a delayed plant output.

According to another exemplary embodiment of the present invention, there is provided a servo control apparatus for controlling a plant to track a predetermined reference trajectory based on an output of the plant, the apparatus comprising: a reference signal generator generating a reference signal and its derivative signals; and a neural network receiving the reference signal and its derivative signals generated by the reference signal generator, a delayed input of the plant and a delayed output of the plant and generating a plant input at a sampling time.

According to another exemplary embodiment of the present invention, there is provided a computer readable recording medium having recorded thereon a computer readable program for performing a servo control method of controlling a plant to track a predetermined reference trajectory based on an output of the plant, the method comprising: determining a polynomial indicating a reference trajectory desired by the plant and derivatives of the polynomial; sampling a plant output with respect to a plant input; generating a reference signal and its derivative signals with reference to time between samples (a relative time); and determining a plant input at a sampling time using the generated reference signal and its derivative signals, a delayed plant input and a delayed plant output.

A servo control according to the present invention can be applied to, for example, a servo control of a hard disk drive (HDD), e.g., a control for servo track writing and a control for track tracking.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Hereinafter, preferred embodiments of the present invention will now be described in detail with reference to the accompanying drawings.

Figure 7:
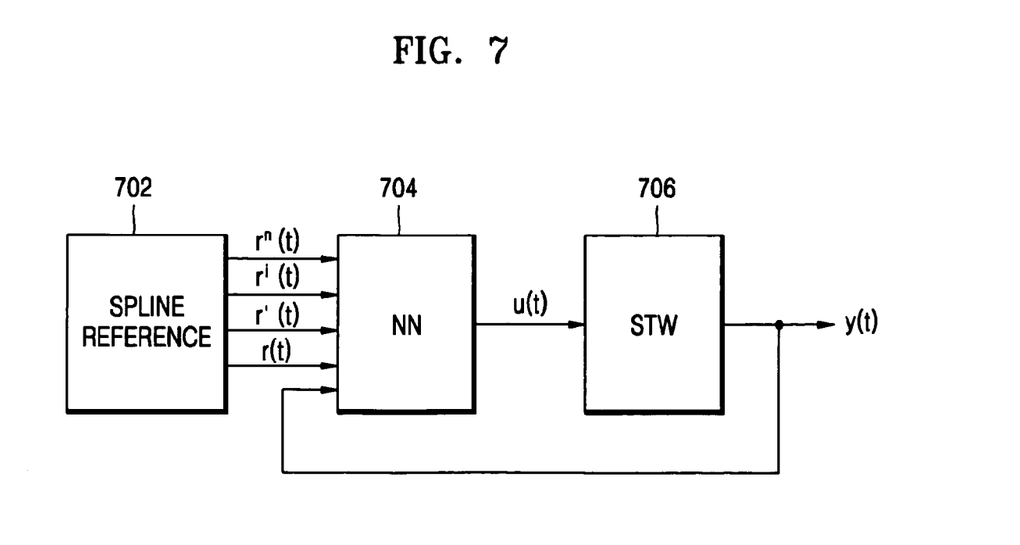
FIG. 7 is a block diagram of a controller according to an exemplary embodiment of the present invention.

FIG. 7 is a block diagram of a controller according to an exemplary embodiment of the present invention. The servo control apparatus shown in FIG. 7 includes a spline reference generator 702 and a neural network 704. FIG. 7 shows an example in which the servo control apparatus is applied to a servo track writer 706.

The spline reference generator 702 is used to provide a reference signal r(t) and its time derivatives of first order to n-th order r'(t), . . . , r$^i$(t), . . . , r$^n$(t).

The generator 702 provides a spline or curve, which has very high accuracy and is used to provide a natural and effective model of a plant, or a piecewise polynomial function indicating the curve. In general, the spline indicates a curve connecting a plurality of dots, wherein partial curves between dots are presented by the polynomial function. The spline is mainly used for an interpolation or an approximation in a numerical analysis.

The spline reference signal r(t) is represented by a set P of polynomials, each polynomial of order m.

$$P = \{p_k(.)\}, k = 1 \ldots l \tag{1}$$

$$p_k(\nabla t_k) = \sum_{j=0}^{m} a_j (\nabla t_k)^j \tag{2}$$

For a servo control operation by the spline reference signal r(t), each polynomial Pk is active for a certain time interval $t_k$ within a time sequence T. That is, when $t_k$ denotes an interval between dots forming the spline and a duration index k= 1, . . . , 1, Pk whose order is m is a polynomial active in a k-th duration. Also, j denotes an index for indicating the order of the polynomial Pk.

$$T = \{t_k\}, k=0 \ldots 1 \tag{3}$$

$$t_{k-1} \leq t < t_k \Rightarrow t \in \Delta t_k \tag{4}$$

The polynomials of Equation 2 are represented using a relative time, which means time between samples.

$$\nabla t_k = t - t_{k-1}, \text{ for } t_{k-1} \leq t < t_k \tag{5}$$

The order of polynomials in the set P is selected to appropriately represent the reference signal r(t). Some examples are as follows.

1) Position reference establishment (in a case of typical servo writing): all derivatives are 0, and polynomials include only a constant.

2) A ramp reference signal (in a case of spiral servo writing): a first derivative (velocity) is not 0, the polynomials in the set P are the first order, and polynomials with respect to the first derivative are a constant.

3) Reference signals of higher order

4) A square wave reference signal (in a case of track seek by a square wave trajectory): the first derivative (velocity) and a second derivative (acceleration) are not 0.

5) An exponential signal: a limited number of derivatives are not 0, however a signal can be approximated using certain polynomials having arbitrary accuracy with respect to a predetermined time interval.

6) A sinusoidal signal (in a case of track seek by a sine wave trajectory): a limited number of derivatives are not 0, however a signal can be approximated using certain polynomials having arbitrary accuracy with respect to a predetermined time interval.

A significant portion of the spline reference generator 702 operation can be prepared with an offline operation effectively realized using a polynomial structure of the spline reference signal r(t).

$$p_k^{(i)}(\nabla t_k) = \frac{d^i}{dt^i} p_k(\nabla t_k) = \sum_{j=i}^{m} \frac{j!}{(j-i)!} \cdot a_j (\nabla t_k)^{j-i} \tag{6}$$

Offline operation;

1) A trajectory resulting from sectional polynomial functions P and switching timings T of the spline reference generator 702 is selected as a method of drawing a desired movement with sufficient accuracy.

2) A required number n of derivatives is determined.

3) Polynomials representing derivatives of polynomials in P are calculated in advance using Equation 6.

Online operation;

1) A relative time in each time duration at a certain sampling time is calculated using Equation 5.

2) A polynomial Pk corresponding to its time duration is evaluated with respect to the relative time using Equation 2. The spline reference generator 702 calculates a reference signal at a desired time with reference to the relative time.

3) Derivative signals of the reference signal at the desired time are calculated using the polynomial derivatives (Equation 6) pre-calculated in operation 3) of the offline operation.

In other words, the reference signal is determined in operation 2) of the online operation, and the derivative signals of the reference signal are determined in operation 3) of the online operation.

The obtained reference signal and its derivative signals are provided to the neural network 704 shown in FIG. 7.

The neural network 704 operates using delay values of a plant input and output, the reference signal and the derivative signals of the reference signal at sampling times. Like signal processing terms, $z^{-k}$ denotes a delay of samples by a k time. A plant input at a subsequent sampling time is determined by using the reference signal and derivative signals and the delayed plant input and output.

1) A plant output vector $$[1, z^{-1}, \ldots, z^{-i}, \ldots, z^{-na}]y \tag{7}$$

2) A plant input vector $$[z^{-1}, \ldots, z^{-i}, \ldots, z^{-nb}]u \tag{8}$$

3) A reference and derivatives vector $$\left[ r(t), \frac{d}{dt}r(t), \ldots, \frac{d^i}{dt^i}r(t), \ldots, \frac{d^n}{dt^n}r(t) \right] \quad (9)$$

The vectors of Equations 7, 8 and 9 are combined to form an input of the neural network 704 of FIG. 7. An output of the neural network 704 is a plant input at a subsequent sampling time.

Figure 8:
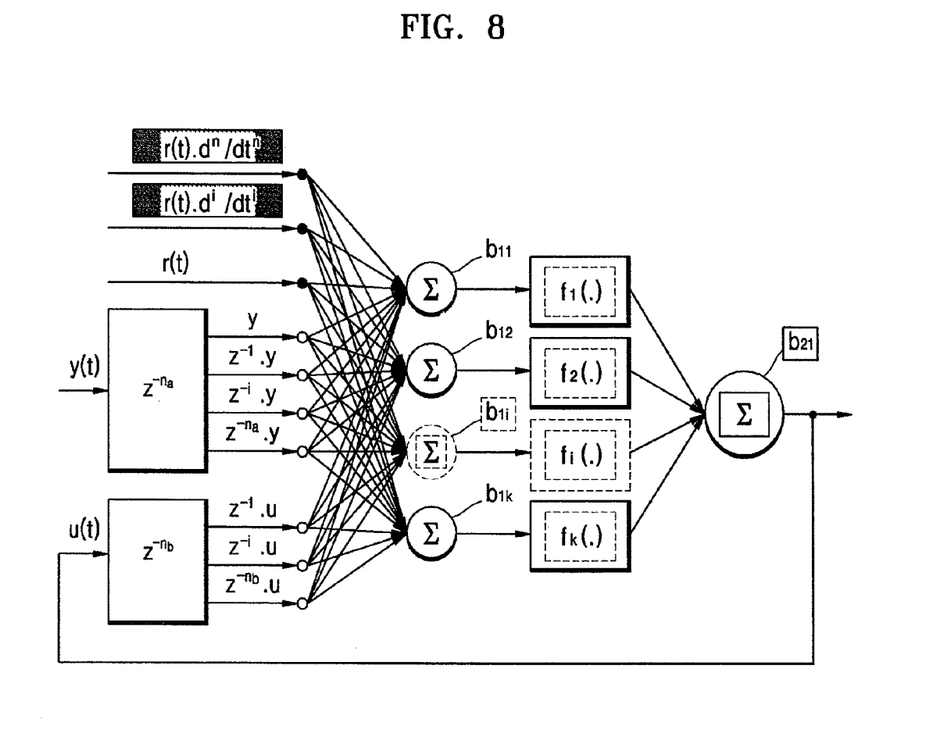
FIG. 8 is an example of a neural network shown in FIG. 7.

FIG. 8 is an example of the neural network 704 shown in FIG. 7.

The network shown in FIG. 8 is a multi-layer perceptron type, which is not necessary to implement the present embodiment. A multi-layer perceptron network output is calculated using layers, scales and shifts of neurons.

As is known in the neural network field, a network input is first multiplied using a weight matrix to form an input of a first neural layer and shifted using a bias vector. An output of the first neural layer is scale-adjusted using the matrix multiplication again and shifted using a bias vector. A general expression representing a neural network output Out with respect to a neural network input In is given by Equation 10.

$$\text{Out} = b_2 + W_2 f(b_1 + W_1 \cdot \text{In}) \quad (10)$$

Here, $W_1$, $W_2$, $b_1$ and $b_2$ denote the weight matrix of the first neural layer, a weight matrix of a second neural layer, a bias matrix of the first neural layer and a bias matrix of the second neural layer, respectively.

The matrices $W_1$, $W_2$, $b_1$ and $b_2$ have appropriate dimensions and include network control variables. Also, f(.) denotes a vector of neural stimulus functions. The variables are selected using offline training according to a method of minimizing errors of plant outputs with respect to reference signals.

The stimulus functions vector f(.) have k neurons having another functional sigmoid type or an identification function if possible. The vector has the following types of functions:

1) A log sigmoid transfer function $$f(x) = \frac{1}{1 + e^{-x}} \quad (11)$$

2) A hyperbolic tangent sigmoid transfer function $$f(x) = \frac{2}{1 + e^{-2n}} - 1 \quad (12)$$

3) Identification $$f(x) = x \quad (13)$$

Figure 9:
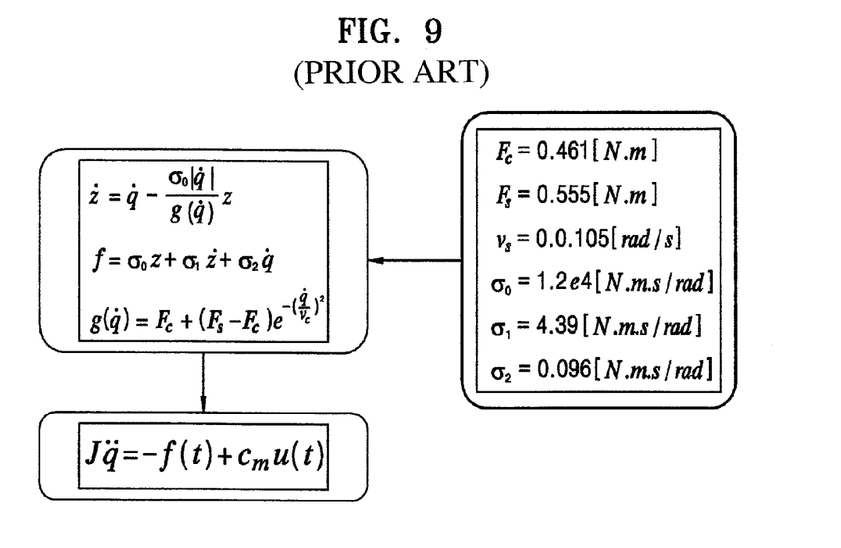
FIG. 9 illustrates a LuGre friction model.

FIG. 9 illustrates a LuGre friction model.

The friction model (LuGre) of an active system is shown in FIG. 9. A simulation is performed using a proposed controller having a basic PID model, a spline reference and a feedback/feed forward neural network.

Figure 10:
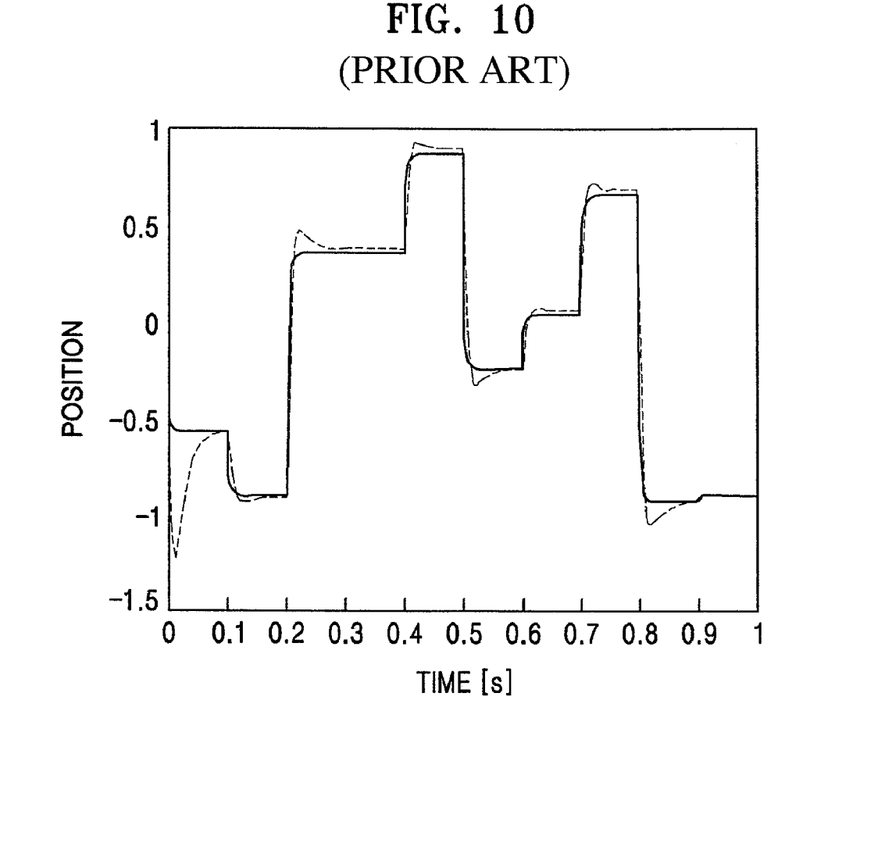
FIG. 10 is a diagram illustrating a tracking trajectory by the conventional PID controller for a plant having the LuGre friction model shown in FIG. 9.

FIG. 10 is a diagram illustrating a tracking trajectory by the conventional PID controller for a plant having the LuGre friction model shown in FIG. 9. FIG. 10 shows the tracking trajectory with respect to a step type reference trajectory.

Referring to FIG. 10, the trajectory shown as a thin dot line tracks the reference trajectory shown as a thick solid line. That is, according to the conventional PID control method, the tracking trajectory is delayed or overshot at positions where there exist steps of the reference trajectory. In other words, time is necessary for adapting to the reference trajectory.

Figure 11:
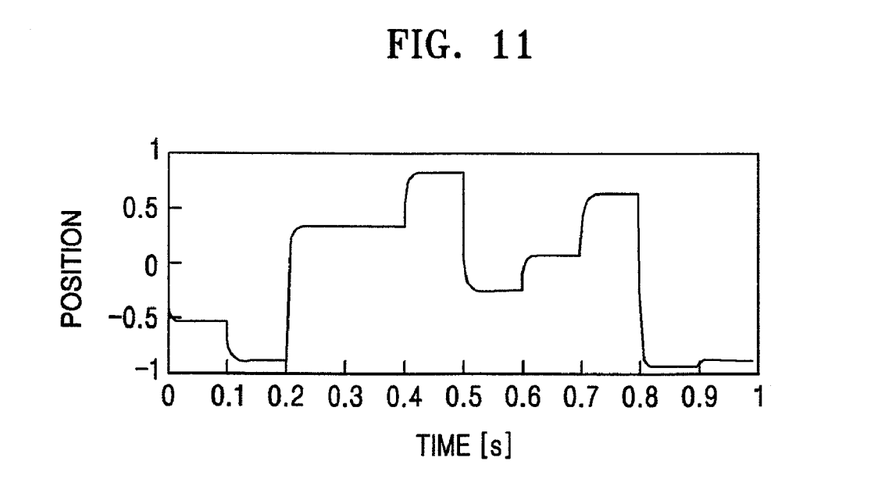
FIG. 11 is a diagram illustrating a tracking trajectory by the controller according to an exemplary embodiment of the present invention for the plant having the LuGre friction model shown in FIG. 9.

FIG. 11 is a diagram illustrating a tracking trajectory by the controller according to an exemplary embodiment of the present invention for the plant having the LuGre friction model shown in FIG. 9. Comparing FIG. 11 to FIG. 10, the tracking trajectory by the controller according to this exemplary embodiment is slightly delayed or overshot at positions where there exist steps of the reference trajectory. In other words, the time necessary for adapting to the reference trajectory is very short.

Figure 12:
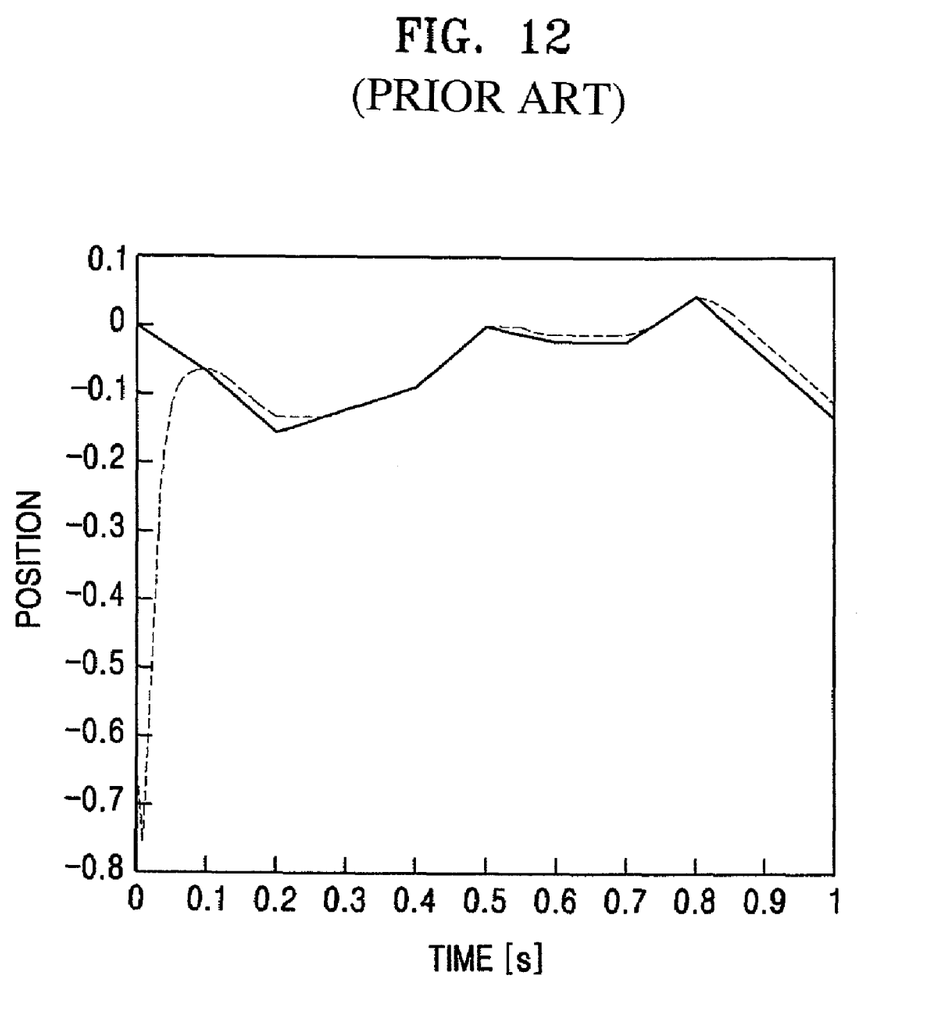
FIG. 12 is a diagram illustrating another tracking trajectory by the conventional PID controller for the plant having the LuGre friction model shown in FIG. 9.

FIG. 12 is a diagram illustrating another tracking trajectory by the conventional PID controller for the plant having the LuGre friction model shown in FIG. 9.

Referring to FIG. 12, the trajectory shown as a thin dot line tracks the reference trajectory shown as a thick solid line, showing a delay and vibration of a limited cycle.

Figure 13:
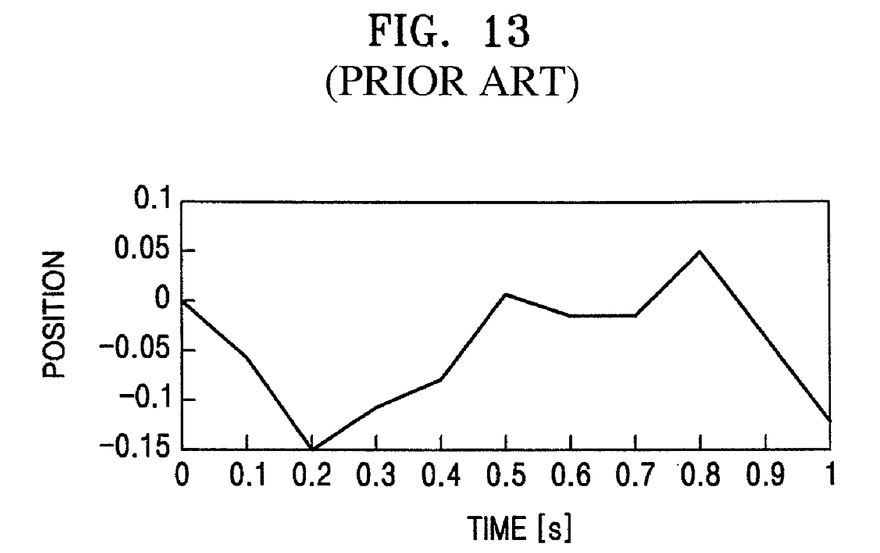
FIG. 13 is a diagram illustrating a ramp tracking trajectory by the conventional neural network.

FIG. 13 is a diagram illustrating a ramp tracking trajectory by the conventional neural network. The example shown in FIG. 13 corresponds to a feed forward control without using derivatives. Referring to FIG. 13, for the ramp tracking trajectory by the conventional neural network, there still exist delays at bent positions of the ramp trajectory and limited vibration over the ramp trajectory, even if they are small as compared with the tracking by the conventional PID control shown in FIG. 10.

Figure 14:
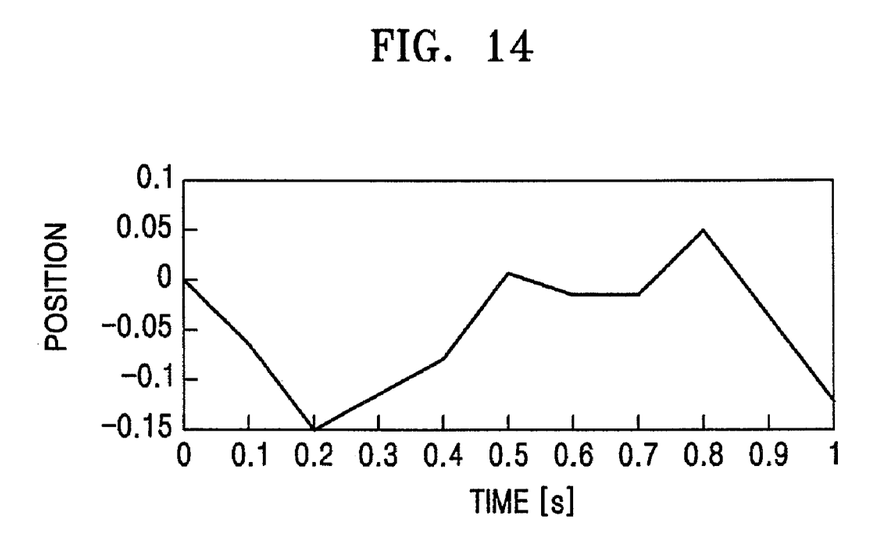
FIG. 14 is a diagram illustrating a ramp tracking trajectory by the controller according to an exemplary embodiment of the present invention.

FIG. 14 is a diagram illustrating a ramp tracking trajectory by the controller according to the embodiment of the present invention.

Referring to FIG. 14, according to the controller according to an exemplary embodiment, there exists small delays at the bent positions of the ramp trajectory and limited vibration over the ramp trajectory as compared with the ramp tracking by the conventional neural network.

The present embodiment can be applied to a positioner of a servo track writer and a track seek controller of an HDD.

Figure 15:
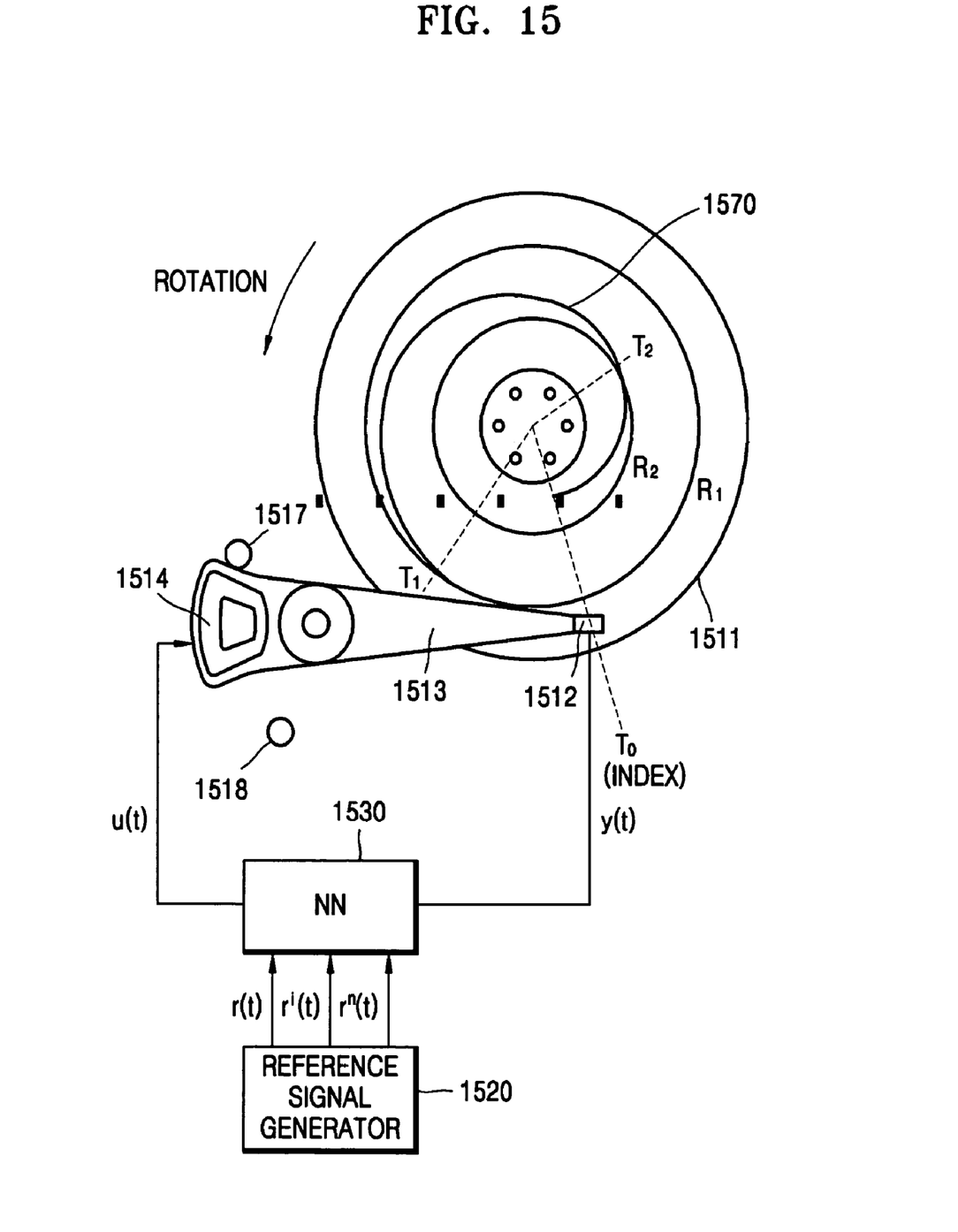
FIG. 15 is a schematic diagram illustrating an example in which a servo control apparatus according to an exemplary embodiment of the present invention is applied to a positioner of a servo track writer.

FIG. 15 is a schematic diagram illustrating an example in which a servo control apparatus according to an exemplary embodiment of the present invention is applied to a positioner of a servo track writer.

In FIG. 15 shown are a disk 1511 combined with a rotating spindle motor (not shown), a position-controllable read/write transducer (head) 1512 attached to a pivot-rotating actuator arm 1513, two crash stoppers 1517 and 1518 and a voice coil 1514.

If the voice coil 1514 is excited and the actuator arm 1513 moves across the disk 1511, the head 1512 is located at an arbitrary location between $R_1$ and $R_2$ on the disk 1511, wherein $R_1$ and $R_2$ denote reference tracks established at different predetermined locations on the disk 1511. If a signal is recorded on the disk 1511 while the head 1512 moves between the reference tracks $R_1$ and $R_2$ on the disk 1511 at constant velocity in a radial direction, the signal is recorded in a spiral shape as shown as the reference numeral 1570 in FIG. 15.

Figure 16:
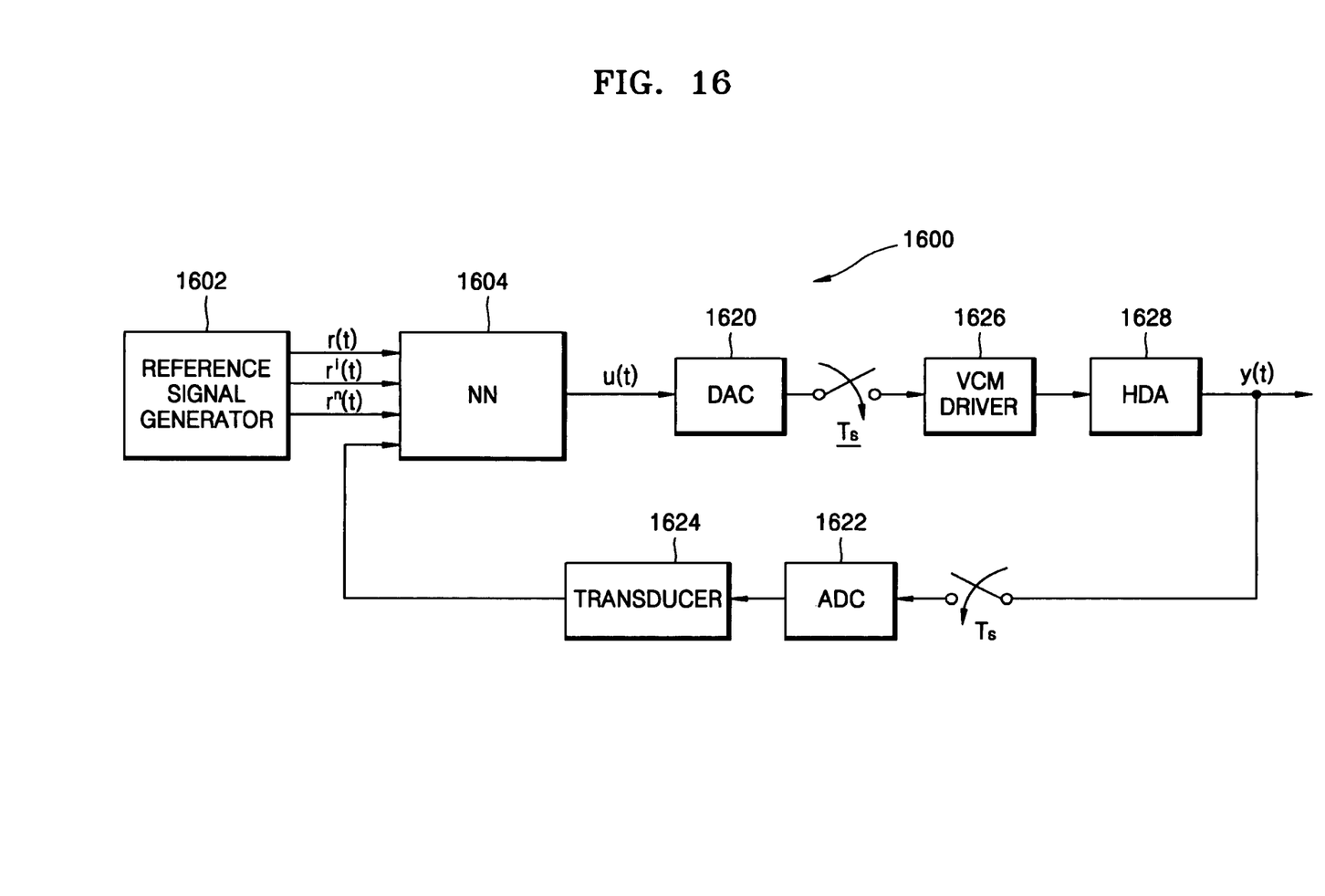
FIG. 16 is a block diagram of a track seek controller of an HDD to which a servo control method according to an exemplary embodiment of the present invention is applied.

A reference signal generator 1520 generates a reference signal r(t) and its derivatives r'(t) and r''(t) representing a desirable trajectory of a write head, and a neural network 1530 controls a location of the write head based on the reference signal r(t) and its derivatives r'(t) and r''(t) generated by the reference signal generator 1520 and location information indicating an actual location of the write head FIG. 16 is a block diagram of a track seek controller 1600 of an HDD to which a servo control method according to an exemplary embodiment of the present invention is applied.

The track seek controller 1600 includes a reference signal generator 1602, a neural network 1604, a digital-to-analog converter (DAC) 1620, a VCM driver 1626, an HDA 1628, an analog-to-digital converter (ADC) 1622, and a transducer 1624. The track seek controller 1600 performs a track seek control routine for moving the transducer 1624 from a first track to a target track located a track seek distance $K_{SK}$ away from the first track.

The reference signal generator 1602 generates a position signal r(k) representing a sinusoidal trajectory in every sampling period $T_S$, a velocity signal v(k) representing derivatives of the position signal r(k), and an acceleration signal a(k).

A sinusoidal acceleration trajectory is represented by a spline polynomial, and the velocity signal v(k) and the acceleration signal a(k) are obtained as a first derivative and a second derivative of the position signal r(k).

Figure 17:
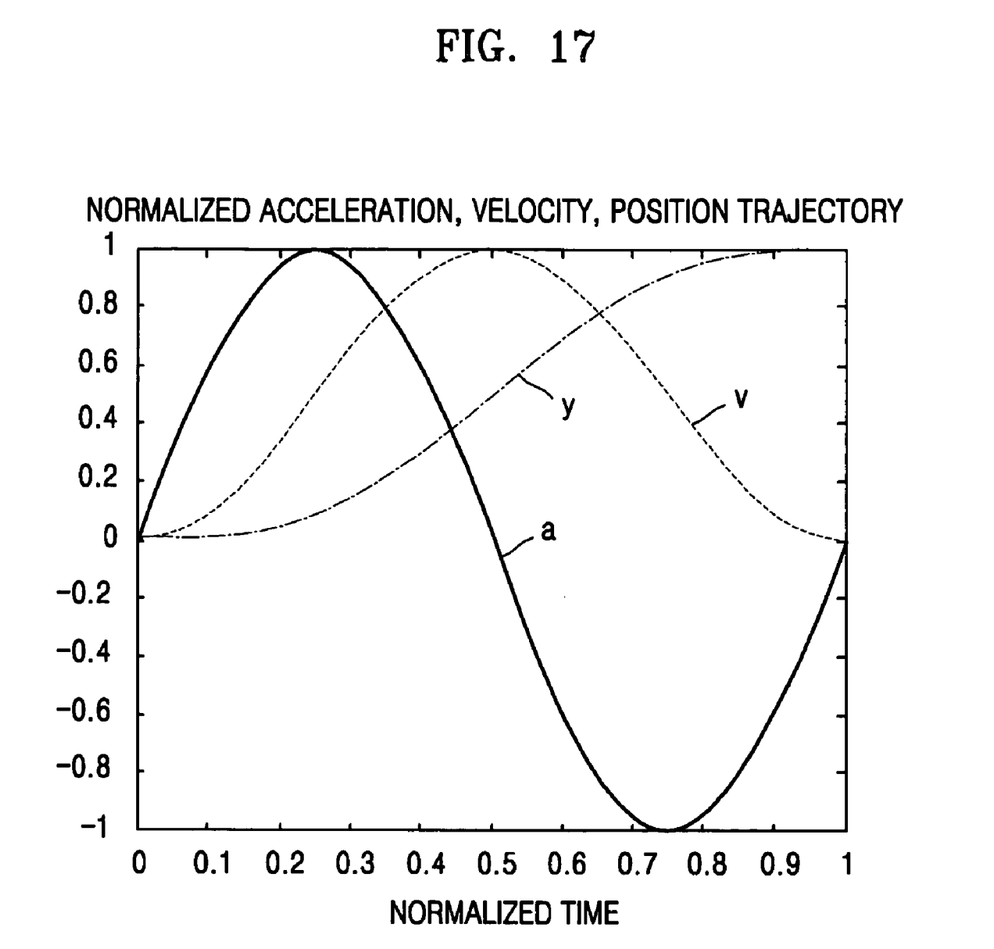
FIG. 17 is a diagram illustrating a position trajectory r(t), a velocity v(t) and an acceleration a(t), which have sinusoidal patterns, in the track seek controller shown in FIG. 16.

FIG. 17 is a diagram illustrating a position trajectory r(t), a velocity v(t) and an acceleration a(t), which have sinusoidal patterns, in the track seek controller 1600 shown in FIG. 16. Referring to FIG. 17, a track seek time $T_{SK}$ corresponds to one period of a sinusoidal acceleration trajectory a.

A location of a track, i.e. a track number, can be obtained using gray code recorded in a sector area, and the transducer 1624 reads the gray code using the ADC 1622 while moving across a disk. The gray code read by the transducer 1624 is provided to the neural network 1604.

The neural network 1604 receives the position signal r(k), the velocity signal v(k) representing derivatives of the position signal r(k) and the acceleration signal a(k), which are provided by the reference signal generator 1602. Also, the neural network 1604 receives a signal y(t) indicating a head position read by the transducer 1624, i.e., the head position represented by the gray code, and generates a driving signal u(t) provided to the VCM driver 1626. The driving signal u(t) is provided to the VCM driver 1626 through the DAC 1620. The neural network 1604, for example, has a configuration shown in FIG. 8. The transducer 1624 moves by driving of the VCM driver 1626 through the HDA 1628.

Figure 18:
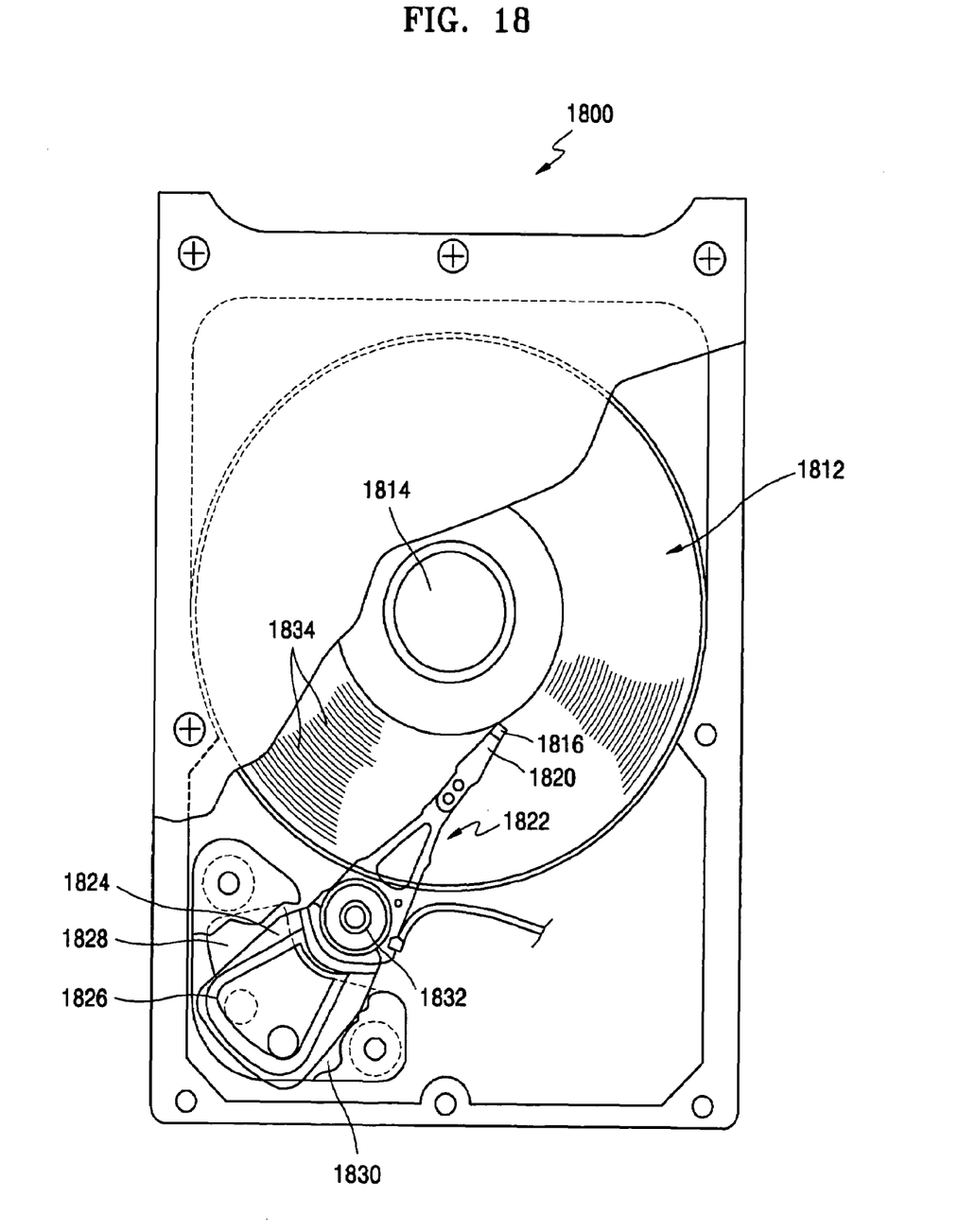
FIG. 18 is a schematic plan view of an HDD to which the servo control method according to an exemplary embodiment of the present invention is applied.

FIG. 18 is a schematic plan view of an HDD 1800 to which the servo control method according to an exemplary embodiment of the present invention is applied. Referring to FIG. 18, the HDD 1800 includes at least one disk 1812 rotated by a spindle motor 1814. The HDD 1800 also includes a transducer 1816 adjacently located on a surface of a disk 1812.

The transducer 1816 can read or write information from or on the rotating disk 1812 by sensing a magnetic field formed on the disk 1812 or magnetizing the disk 12. Typically, the transducer 1816 is combined on a surface of each disk 1812. Though a single transducer 1816 is shown in FIG. 18, the transducer 1816 includes a write transducer which magnetizes the disk 1812 and a read transducer which senses a magnetic field of the disk 1812. The read transducer is composed of a magneto-resistive (MR) component.

The transducer 1816 can be combined with a slider 1820. The slider 1820 generates an air bearing between the transducer 1816 and the surface of the disk 1812. The slider 1820 is combined with a head gimbal assembly (HGA) 1822. The HGA 1822 is attached to an actuator arm 1824 having a voice coil 1826. The voice coil 1826 is located adjacent to a magnetic assembly 1828 specifying (supporting) a voice coil motor (VCM) 1830. A current supplied to the voice coil 1826 generates a torque that rotates the actuator arm 1824 around a bearing assembly 1832. The rotation of the actuator arm 1824 moves the transducer 1816 across the surface of the disk 1812.

Information is stored in concentric tracks of the disk 1812. In general, each track 1834 includes a plurality of sectors. Each sector includes a data field and an identification field. The identification field is comprised of gray code identifying sectors and tracks (cylinders). The transducer 1816 moves across the surface of the disk 1812 to read or write information from or on another track.

Figure 19:
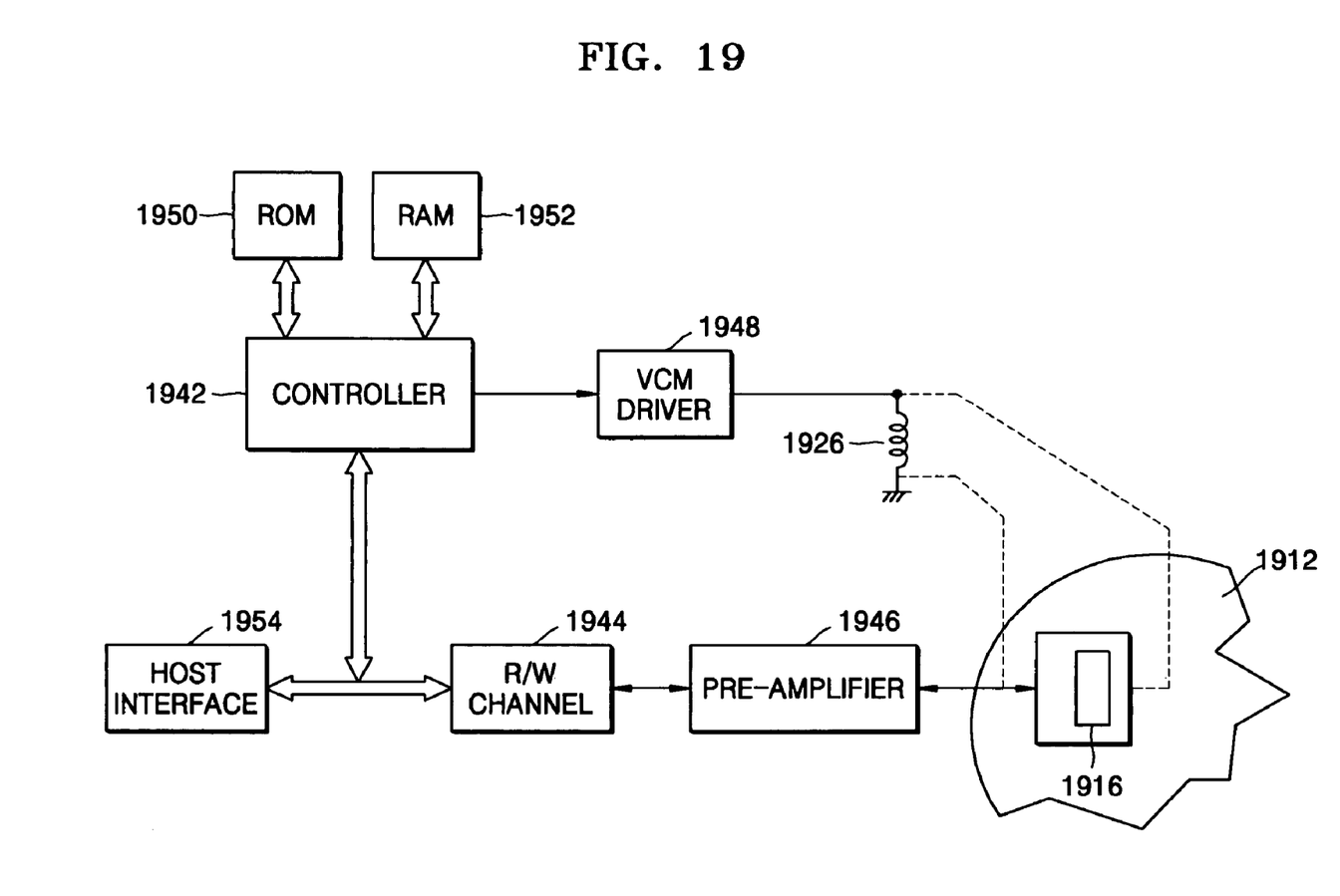
FIG. 19 is a block diagram of an electric system controlling the HDD shown in FIG. 18.

FIG. 19 is a block diagram of an electric system for controlling the HDD 1800 shown in FIG. 18. Referring to FIG. 19, the electric system includes a controller 1942 which is combined with the transducer 1816 through a read/write (R/W) channel 1944 and a read pre-amplifier 1946. The controller 1942 can be a digital signal processor (DSP), a microprocessor or a micro-controller. The controller 1942 provides a control signal to the R/W channel 1944 to read data from the disk 1812 or write data on the disk 1812. Information is typically transmitted from the R/W channel 1944 to a host interface circuit 1954. The host interface circuit 1954 includes a buffer memory and a control circuit, which allow the HDD 1800 to interface a system such as a personal computer.

The controller 1942 is combined with a VCM driver 1948 supplying a driving current to the voice coil 1826. The controller 1942 supplies a control signal to the VCM driver 1948 to control excitation of a VCM and a motion of the transducer 1816.

The controller 1942 is combined to a nonvolatile memory 1950, such as a read only memory (ROM) or a flash memory, and a random access memory (RAM) 1952. The memory devices 1950 and 1952 stores therein commands and data used by the controller 1942 to execute software routines. The software routines include a seek control routine for moving the transducer 1816 from one track to another. The seek control routine includes a servo control routine for guaranteeing that the transducer 1816 is moved to an exact track. As an embodiment, in the memory device 1950, execution codes for performing the seek control method described with reference to FIG. 17 are stored.

The present invention can be realized as a method, an apparatus, and/or a system. When the present invention is realized as software, components of the present invention are embodied as code segments for executing required operations. A program or the code segments can be stored in a processor readable recording medium and transmitted as computer data signals combined with a carrier using a transmission medium or a communication network. The processor readable recording medium is any data storage device that can store or transmit data which can be thereafter read by a computer system, except for electromagnetic carrier signals. Examples of the processor readable recording medium include electronic circuits, semiconductor memory devices, read-only memory (ROM), flash memory, erasable ROM, floppy disks, optical disks, hard disks, optical fiber media, and RF networks. The computer data signals include any signal which can be propagated via transmission media such as electronic network channels, optical fibers, air, electronic fields, RF networks.

As described above, in a servo control method according to embodiments of the present invention, a plant is controlled to track a reference trajectory with enhanced accuracy using a reference signal and its derivative signals.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A servo control method of tracking a predetermined reference trajectory based on an output of a plant, the method comprising:
    determining a polynomial indicating a desired reference trajectory and derivatives of the polynomial;
    sampling a plant output with respect to a plant input;
    generating a reference signal and its derivative signals with reference to a relative time between samples; and
    determining a plant input at a sampling time using the generated reference signal and its derivative signals, a delayed plant input and a delayed plant output;
    wherein the polynomial is a spline polynomial.

2. The method of claim 1, wherein the reference trajectory has a ramp pattern, the order of the polynomial is 1, and the derivatives include a non-zero first derivative.

3. The method of claim 1, wherein the reference trajectory has a square wave pattern, and the derivatives include a non-zero first derivative (velocity) and a non-zero second derivative (acceleration).

4. The method of claim 1, wherein the reference trajectory has a sinusoidal pattern, and the derivatives are approximated using polynomials of a predetermined time interval.

5. The method of claim 1, wherein the spline polynomial and its derivatives are determined offline.

6. The method of claim 1, wherein the determining of the polynomial and its derivatives comprises:
    determining a spline polynomial representing the reference trajectory; and
    determining derivatives of a spline signal required according to a characteristic of the plant,
    wherein the polynomial and derivatives are determined offline.

7. The method of claim 1, wherein the generating of a reference signal and its derivative signals is performed online.

8. The method of claim 7, wherein the generating of a reference signal and its derivative signals online comprises:
    calculating a relative time between samples;
    generating the reference signal with reference to the relative time and the spline polynomial; and
    generating the derivative signals of the reference signal using the derivatives.

9. The method of claim 1, wherein the determining of the plant input is performed using a neural network.

10. The method of claim 9, wherein the neural network is trained offline by a method of minimizing errors of a plant output.

11. The method of claim 10, wherein the neural network operates using a feedback control method.

12. The method of claim 10, wherein the neural network operates using a feed forward control method.

13. The method of claim 10, wherein the neural network operates using a feedback and feed forward control method.

14. A servo control apparatus for tracking a predetermined reference trajectory based on an output of a plant, the apparatus comprising:
    a reference signal generator for generating a reference signal and its derivative signals; and
    a neural network for receiving the reference signal and its derivative signals generated by the reference signal generator, a delayed input of the plant and a delayed output of the plant, and for generating an input at a sampling time;
    wherein the reference signal generator stores a spline polynomial representing a desirable reference trajectory and its derivatives and generates the reference signal and derivative signals with reference to a sampling time interval.

15. The apparatus of claim 14, wherein the spline polynomial and its derivatives are determined offline.

16. The apparatus of claim 14, wherein the reference trajectory has a ramp pattern, the order of the polynomial is 1, and the derivatives include a non-zero first derivative.

17. The apparatus of claim 14, wherein the reference trajectory has a square wave pattern, and the derivatives include a non-zero first derivative and a non-zero second derivative.

18. The apparatus of claim 14, wherein the reference trajectory has a sinusoidal pattern, and the derivatives are approximated using polynomials of a predetermined time interval.

19. The apparatus of claim 14, wherein the neural network is a multi-layer perceptron neural network.

20. The apparatus of claim 19, wherein the neural network is trained offline to minimize errors of the plant.

21. A computer readable recording medium having recorded thereon a computer readable program for performing a servo control method of tracking a predetermined reference trajectory based on an output of a plant, the method comprising:
    determining a polynomial indicating a desired reference trajectory and derivatives of the polynomial;
    sampling a plant output with respect to a plant input;
    generating a reference signal and its derivative signals with reference to a relative time between samples; and
    determining a plant input at a sampling time using the generated reference signal and its derivative signals, a delayed plant input and a delayed plant output;
    wherein the polynomial is a spline polynomial.

22. A position control apparatus for controlling a position of a write head writing servo track information, the apparatus comprising:
    a reference signal generator for generating a reference signal representing a desirable trajectory of the write head; and
    a neural network controlling a position of the write head based on the reference signal and its derivative signals generated by the reference signal generator and location information indicating an actual position of the write head;
    wherein the reference signal generator stores a spline polynomial representing a desirable reference trajectory and its derivatives and generates the reference signal and derivative signals with reference to a sampling time interval.

* * * * *